US012444344B2

(12) United States Patent
Ma

(10) Patent No.: US 12,444,344 B2

(45) Date of Patent: Oct. 14, 2025

(54) LED DRIVER CIRCUIT AND LED DISPLAY APPARATUS

(71) Applicant: Chipone Technology (Beijing) Co., Ltd., Beijing (CN)

(72) Inventor: Yingjie Ma, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/268,304

(22) PCT Filed: Nov. 15, 2021

(86) PCT No.: PCT/CN2021/130740

§ 371 (c)(1),
(2) Date: Jun. 19, 2023

(87) PCT Pub. No.: WO2022/127469

PCT Pub. Date: Jun. 23, 2022

(65) Prior Publication Data

US 2024/0038146 A1 Feb. 1, 2024

(30) Foreign Application Priority Data

Dec. 17, 2020 (CN) ......................... 202011502630.0

(51) Int. Cl.
*G09G 3/32* (2016.01)

(52) U.S. Cl.
CPC ....... *G09G 3/32* (2013.01); *G09G 2310/0291* (2013.01); *G09G 2310/061* (2013.01)

(58) Field of Classification Search
CPC ...... G09G 3/32; G09G 3/3208; G09G 3/3406; H05B 45/46
See application file for complete search history.

(56) References Cited

U.S. PATENT DOCUMENTS 9,651,632 B1 * 5/2017 Knapp .................. H05B 45/10
2007/0013634 A1 1/2007 Saiki et al.
(Continued)

FOREIGN PATENT DOCUMENTS

CN 101330070 12/2008
CN 102592542 7/2012
(Continued)

OTHER PUBLICATIONS

Texas Instruments Technical Bulletin, , Texas Instruments Incorporated, Copyright © 2004-2015 (Year: 2015).*
(Continued)

*Primary Examiner* — Yuzhen Shen
(74) *Attorney, Agent, or Firm* — Treasure IP Group, LLC

(57) ABSTRACT

Disclosed in an embodiment of the present application is an LED driver circuit and an LED display apparatus. The LED driver circuit comprises: a first component area, which comprises a first driving channel group and a second driving channel group that are arranged symmetrically and comprise a same number of driving channels, respectively; and a second component area, which is provided with an analog ground pad connected to a substrate of the driving channels through a metal wire. According to the present application, chip internal noise can be effectively reduced, and accuracy of matching output currents of the driving channels can be improved to obtain good current consistency, thereby being beneficial to guarantee display effect of a LED display screen.

18 Claims, 3 Drawing Sheets

1

(56) References Cited

U.S. PATENT DOCUMENTS

| | | | | |
|---|---|---|---|---|
| 2010/0289982 | A1* | 11/2010 | Akiyama | H05B 45/46 257/E29.166 |
| 2011/0234110 | A1* | 9/2011 | Liu | H05B 45/345 315/186 |
| 2012/0287097 | A1 | 11/2012 | Akiyama et al. | |
| 2015/0013770 | A1 | 1/2015 | Tipler | |
| 2021/0029800 | A1* | 1/2021 | Cheng | H05B 45/50 |
| 2021/0274616 | A1 | 9/2021 | Kanemitsu et al. | |

FOREIGN PATENT DOCUMENTS

| | | | | | |
|---|---|---|---|---|---|
| CN | 102711323 | | | 10/2012 | |
| CN | 104050924 | A | * | 9/2014 | G09G 3/32 |
| CN | 204335010 | | | 5/2015 | |
| CN | 204335010 | U | | 5/2015 | |
| CN | 108650744 | A | * | 10/2018 | H05B 45/32 |
| CN | 111369932 | A | | 7/2020 | |
| CN | 112466249 | | | 3/2021 | |
| JP | 2007243128 | A | | 9/2007 | |
| KR | 20100053907 | | | 5/2010 | |
| WO | WO-2009124432 | A1 | * | 10/2009 | H05B 33/0842 |
| WO | 2020054096 | | | 3/2020 | |

OTHER PUBLICATIONS

Yuan, Chaohui. "The Design of a 16-Channel-Led Driver IC with Constant Current" China Master's Theses Full-text Database, Information Technology, No. 07, Jul. 15, 2011 (Jul. 15, 2011), ISSN: 1674-0246, pp. 5, 55-68.

Li, Changhong. "The Design of a 16-Channel-Led Driver IC with Constant Current)" China Master's Theses Full-text Database, Information Technology, No. 07, Jul. 15, 2013 (Jul. 15, 2013), ISSN: 1674-0246, pp. 4, 53-57.

KR A (Shin Mu Hyun) May 24, 2010 (May 24, 2010).

Yuan Chaohui: "The Design of a 16-Channel-Led Driver IC with Constant Current", China Master's Theses Full-text Database, Information Technology, Jan. 1, 2011 (Jan. 1, 2011), pp. 1-81, XP055942468.

16-Channel LED Driver With Dot Correction and Grayscale PWM Control.SLVS589D—Jul. 2005—Revised Jan. 2008.

* cited by examiner output channel

LED DRIVER CIRCUIT AND LED DISPLAY APPARATUS

CROSS-REFERENCE TO RELATED APPLICATION

The present application is a Section 371 National Stage application of International Application No. PCT/CN2021/130740, which is filed on 15 Nov. 2021 and published as WO/2022/127469 A1 on 23 Jun. 2022, and claims priority to Chinese patent application No. 202011502630.0, filed on Dec. 17, 2020, and entitled "LED Driver Circuit", the entire contents of which are incorporated herein by reference in their entireties.

FIELD OF THE DISCLOSURE

The present disclosure relates to a technical field of integrated circuits, in particular to an LED driver circuit and an LED display apparatus.

DESCRIPTION OF THE RELATED ART

As people pay more and more attention to science, technology and environment, LED (light emitting diode) has been widely used in information display field because of its high efficiency, safety, long service life and other advantages. LED display screen has also been developed rapidly. At the same time, people also put forward higher requirements for display quality of LED display screens, and quality of a driver chip for an LED display screen plays a crucial and even decisive role in the display quality of the LED display screen. At present, most of the mainstream LED display driver chips in the market use multi-channel constant current output architecture to meet the requirements of driving an LED dot matrix with a large number of LEDs. Due to multi-channel output and cascade application conditions, poor current consistency of rows and columns of the LED dot matrix will significantly affect the display effect of the display screen.

SUMMARY

An objective of embodiments of the present application is to provide an LED driver circuit and an LED display apparatus.

According to an aspect of embodiments of the present disclosure, an LED driver circuit is provided, and comprises: a first component area, which comprises a first driving channel group and a second driving channel group, wherein the first driving channel group and the second driving channel group are symmetrically distributed, and the first driving channel group and the second driving channel group respectively comprise a same number of driving channels; a second component area, provided with an analog ground pad connected to a substrate of the driving channels through a metal wire.

Optionally, each of the driving channels comprises: a common-source device module, disposed proximate to a symmetry axis between the first driving channel group and the second driving channel group; a common-gate device module, adjacent to the common-source device module; an electrostatic protection module, adjacent to the common-gate device module; an operational amplifier module, adjacent to the electrostatic protection module; a blanking module, adjacent to the operational amplifier module and arranged at an edge of a driver chip comprising the LED driver circuit.

Optionally, the common-source device modules in the driving channels of the first driving channel group are arranged adjacent to the common-source device modules in the driving channels of the second driving channel group.

Optionally, in each one of the driving channels of the first driving channel group, the common-source device module, the common-gate device module, the electrostatic protection module, the operational amplifier module and the blanking module are sequentially arranged from right to left; in each one of the driving channels of the second driving channel group, the common-source device module, the common-gate device module, the electrostatic protection module, the operational amplifier module and the blanking module are sequentially arranged from left to right.

Optionally, the first component area further comprises a plurality of output pads, each of which corresponds to a corresponding one of the driving channels and is disposed adjacent to the common-gate device module and the electrostatic protection module in that corresponding one of the driving channels.

Optionally, a number of the plurality of output pads is 16.

Optionally, the first component area further comprises a plurality of power ground pads, each of which corresponds to four corresponding ones of the driving channels, and is disposed on the symmetry axis between the first driving channel group and the second driving channel group.

Optionally, a number of the plurality of power ground pads is 4.

Optionally, the metal wire has an even number of metal lines, which are symmetrically distributed.

Optionally, the metal wire comprises: a first metal line, which is arranged on a left side of the output pads of the first driving channel group, and connected to a substrate of the first driving channel group; a second metal line, which is arranged between the output pads of the first driving channel group and the plurality of power ground pads, and connected to the substrate of the first driving channel group; a third metal line, which is arranged between the output pads of the second driving channel group and the plurality of power ground pads, and connected to a substrate of the second driving channel group; and a fourth metal line, which is arranged on a right side of the output pads of the second driving channel group, and connected to the substrate of the second driving channel group.

Optionally, the common-source device module comprises a first field effect transistor, the common-gate device module comprises a second field effect transistor, and the operational amplifier module comprises an amplifier.

Optionally, a source of the first field effect transistor is grounded, a gate of the first field effect transistor is connected to a first voltage input terminal, a drain of the first field effect transistor is connected to a source of the second field effect transistor, a drain of the second field effect transistor is connected to a circuit output terminal, a gate of the second field effect transistor is connected to an output terminal of the amplifier, a first input terminal of the amplifier is connected to a second voltage input terminal, and a second input terminal of the amplifier is connected to the source of the second field effect transistor.

Optionally, each of the first field effect transistor and the second field effect transistor is an NMOS transistor.

Optionally, the first driving channel group and the second driving channel group each comprise eight driving channels.

Optionally, the second component area is further provided with an analog power supply pad.

According to another aspect of embodiments of the present disclosure, an LED display apparatus is provided, and comprises an LED driver circuit according to any of the embodiments of the present disclosure.

BRIEF DESCRIPTION OF THE DRAWINGS

In order to explain technical solutions according to the embodiments of the present disclosure more clearly, drawings corresponding to the embodiments of the present disclosure are briefly introduced below. It should be understood that the following drawings only illustrate some embodiments of the present application, and therefore should not be regarded as limiting in scope, and other related drawings may be obtained from these drawings without creative effort for those of ordinary skill in the art.

REFERENCE MARKS

Figure 1:
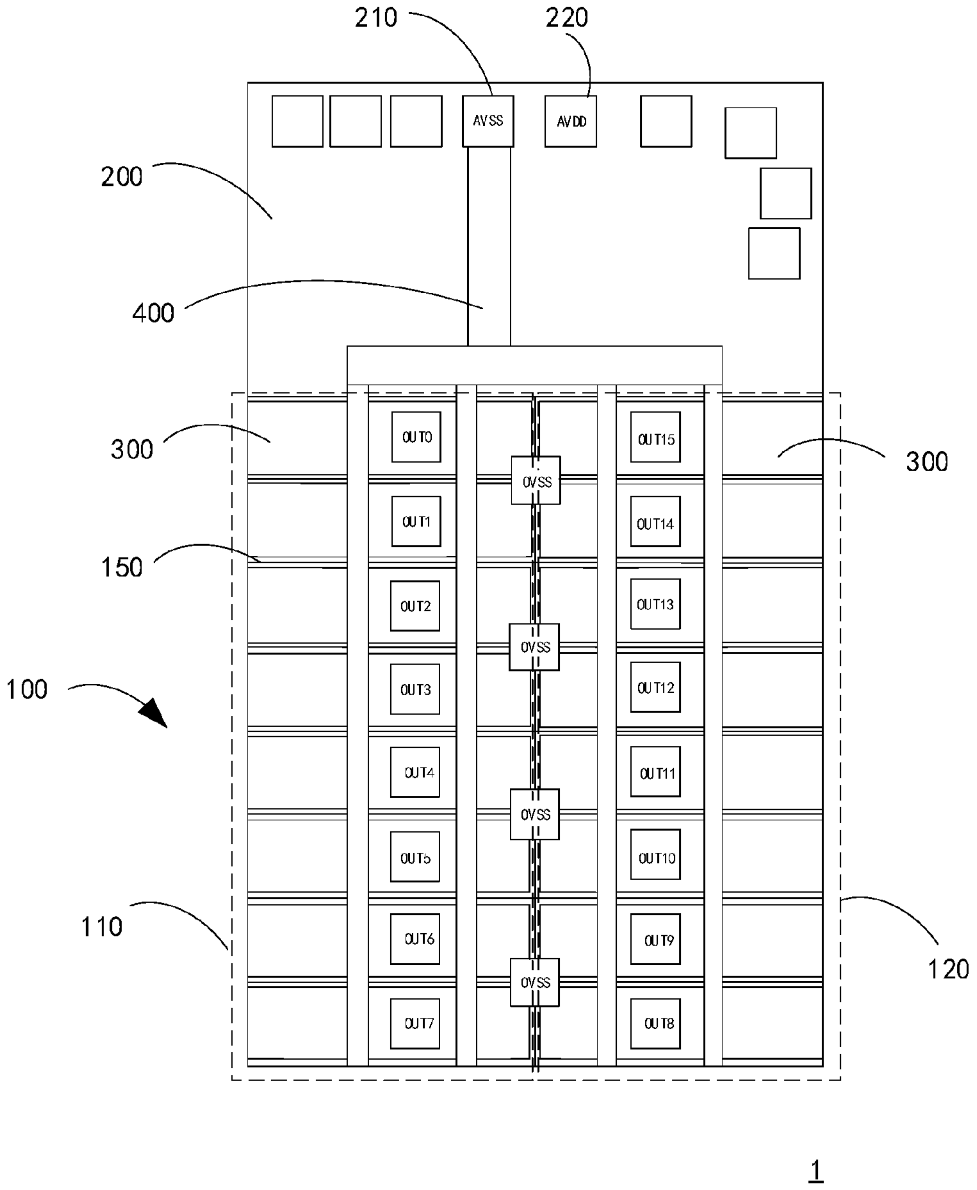
FIG. 1 shows a schematic diagram of an LED driver circuit according to an embodiment of the present application.

1—driver chip;
100—first component area;
110—first driving channel group;
120—second driving channel group;
130—output pad;
140—power ground pad;
150—substrate;
200—second component area;
210—analog ground pad;
220—analog power supply pad;
300—driving channel;
310—common-source device module;
311—first field effect transistor;
320—common-gate device module;
321—second field effect transistor;
330—electrostatic protection module;
340—operational amplifier module;
341—amplifier;
350—blanking module;
400—metal wire;
410—first metal line;
420—second metal line;
430—third metal line;
440—fourth metal line.

DETAILED DESCRIPTION OF EMBODIMENTS OF THE DISCLOSURE

A technical proposal in an embodiment of the present application will be described below with reference to the drawings relating to embodiments of the present application.

In the description of embodiments of the present application, terms "first", "second" and the like are used only to distinguish between descriptions and do not indicate sequential numbering, nor are they to be understood as indicating or implying relative importance.

In the description of embodiments of the present application, terms "including", "comprising" and the like denote the presence of a described feature, an entity, a step, an operation, an element, and/or a component, but do not exclude the presence or addition of one or more other features, steps, operations, elements, components, and/or collections thereof.

In the description of embodiments of the present application, terms "horizontal", "vertical", "overhang" and the like do not imply that the component is required to be absolutely horizontal or overhang, but may be slightly tilted. For example, "horizontal" only means that its direction is more horizontal than "vertical", which does not mean that the structure must be completely horizontal, but can be slightly inclined.

In the description of embodiments of the present application, terms "up", "down", "left", "right", "front", "back", "inside", "outside" and the like indicate orientations or positional relationships that are based on the orientations or positional relationships shown in the drawings, or that are routinely placed in use of the application product, for ease of description only, and are not intended to indicate or imply that the device or element must have a particular orientation, be constructed or operate in a particular orientation, and therefore should not be construed as limiting to embodiments of the present application.

In the description of embodiments of the present application, terms "installed", "arranged", "provided", "connected" and "configured to" are to be understood broadly unless otherwise expressly specified and limited. For example, it can be a fixed connection, a detachable connection, or a monolithic construction; it can be mechanical connection or electrical connection; it can be directly connected, indirectly connected through an intermediate medium, or internally connected between two devices, elements or components. Specific meanings of the above terms in the description of embodiments of the present application may be understood by those of ordinary skill in the art on a case-by-case basis.

FIG. 1 shows a schematic diagram of an LED driver circuit according to an embodiment of the present application. Referring to FIG. 1, a driver chip 1 comprises a first component area 100 and a second component area 200, each of which is rectangular, a lower edge of the first component area 100 is flush with a lower edge of the driver chip 1, a left edge of the first component area 100 is flush with a left edge of the driver chip 1, a right edge of the first component area 100 is flush with a right edge of the driver chip 1, the second component area 200 is located above the first component area 100, an upper edge of the second component area 200 is flush with an upper edge of the driver chip 1, a left edge of the second component area 200 is flush with the left edge of the driver chip 1, and a right edge of the second component area 200 is flush with the right edge of the driver chip 1.

The first component area 100 includes a first driving channel group 110 and a second driving channel group 120, the first driving channel group 110 and the second driving channel group 120 are symmetrically distributed with each other with respect to a symmetrical axis, the first driving channel group 110 and the second driving channel group 120 each includes a same number of driving channels 300. Optionally, the first driving channel group 110 includes eight driving channels 300, and the second driving channel group 120 also includes eight driving channels 300, and the driving channels 300 in the first driving channel group 110 and the driving channels 300 in the second driving channel group 120 are left-right symmetrically distributed. It can be understood that in practical applications, the first driving channel group and the second driving channel group may contain more or fewer driving channels and the above eight driving channels are only taken as a specific example and should not be taken for limitation.

The second component area 200 is provided with an analog ground pad 210 (AVSS PAD) connected to a substrate 150 of the driving channels 300 in the first component area 100 through a metal wire 400. Optionally, the substrate 150 is a P-type substrate. The second component area 200 is further provided with an analog power supply pad 220 (AVDD PAD), and optionally, both of the analog ground pad 210 and the analog power supply pad 220 are disposed close to the upper edge of the second component area 200 near the symmetry axis between the first driving channel group 110 and the second driving channel group 120. Optionally, the metal wire 400 comprises an even number of metal lines which are symmetrically distributed.

Figure 2:
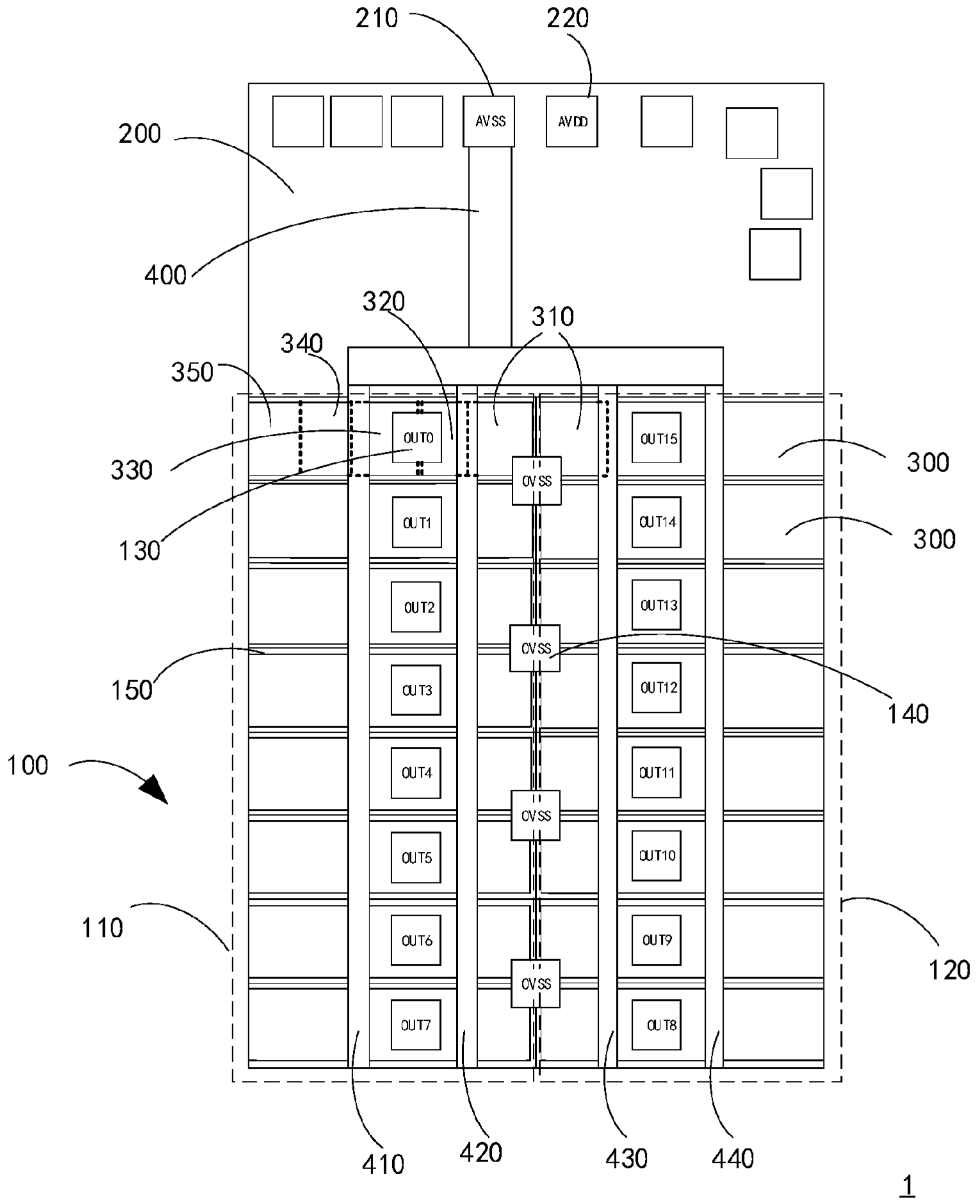
FIG. 2 shows a schematic diagram of an LED driver circuit according to an embodiment of the present application.

FIG. 2 shows a schematic diagram of an LED driver circuit according to an embodiment of the present application. As shown in FIG. 2, the driver chip 1 includes a first component area 100 and a second component area 200. The first component area 100 includes a first driving channel group 110 and a second driving channel group 120, which are symmetrically arranged, and respectively include a same number of driving channels 300.

Each of the driving channels 300 includes: a common-source device module 310, a common-gate device module 320, an electrostatic protection module 330, an operational amplifier module 340, and a blanking module 350, wherein in each of the driving channels 300, the common-source device module 310 is disposed on the driver chip 1 near the symmetry axis between the first driving channel group 110 and the second driving channel group 120, the common-gate device module 320 is adjacent to the common-source device module 310, the electrostatic protection module 330 is adjacent to the common-gate device module 320, the operational amplifier module 340 is adjacent to the electrostatic protection module 330, the blanking module 350 is adjacent to the operational amplifier module 340, and the blanking module 350 is disposed at an edge of the driver chip 1.

The common-source device module 310 is disposed near the symmetry axis between the first driving channel group 110 and the second driving channel group 120, and the common-source device modules 310 in the driving channels of the first driving channel group 110 are adjacent to the common-source device modules 310 in the driving channels of the second driving channel group 120.

Optionally, the common-source device module 310 may be disposed at a middle position of the driver chip 1. In the first driving channel group 110, the common-source device module 310, the common-gate device module 320, the electrostatic protection module 330, the operational amplifier module 340, and the blanking module 350 of each driving channel 300 are sequentially arranged from right to left; and in the second driving channel group 120, the common-source device module 310, the common-gate device module 320, the electrostatic protection module 330, the operational amplifier module 340, and the blanking module 350 of each driving channel 300 are sequentially arranged from left to right.

In the first component area 100, all the driving channels 300 are arranged together, and the common-source device modules 310 which have the greatest influence on mismatch in the driving channels 300 are placed at the middle position of the driver chip 1, so that device mismatch can be effectively reduced, output current matching accuracy among the driving channels 300 can be improved, and good current consistency can be obtained.

The first component area 100 further includes a plurality of output pads 130 (OUT PAD), which correspond to the driving channels 300, respectively, and are each disposed adjacent to the common-gate device module 320 and the electrostatic protection module 330 of a corresponding one of the driving channels 300. Optionally, if the first driving channel group 110 and the second driving channel group 120 each include 8 driving channels 300, the first component area 100 may include 16 output pads 130.

The first component area 100 further includes a plurality of power ground pads 140 (OVSS PAD), each of which corresponds to four driving channels 300, and the power ground pads 140 are disposed on the symmetry axis between the first driving channel group 110 and the second driving channel group 120. Optionally, the first driving channel group 110 and the second driving channel group 120 may each include 8 driving channels 300, and the first component area 100 may include 4 power ground pads 140 accordingly.

The analog ground pad 210 of the second component area 200 is connected to the substrate 150 of the driving channels 300 in the first component area 100 through a metal wire 400. The metal wire 400 includes a first metal line 410, a second metal line 420, a third metal line 430, and a fourth metal wire 440, wherein the first metal line 410 is arranged on a left side of the output pads 130 of the first driving channel group 110, the second metal line 420 is arranged between the power ground pads 140 and the output pads 130 of the first driving channel group 110, the first metal line 410 and the second metal line 420 are used to connect to the substrate 150 of the second driving channel group 120, the third metal line 430 is arranged between the power ground pads 140 and the output pads 130 of the second driving channel group 120, the fourth metal line 440 is arranged on a right side of the output pads 130 of the second driving channel group 120, and the third metal line 430 and the fourth metal line 440 are used to connect to the substrate 150 of the second driving channel group 120.

In the first component area 100, an operating current of each driving channel 300 is generally several milliamperes to tens of milliamperes. According to related technologies, the substrate 150 of the driving channels 300 may be connected to the power supply pads 140, and a current source in each driving channel 300 may be continuously switched on and off under control of display data, which will cause significant noise on the power supply pads 140, resulting in high noise on a substrate voltage potential of the whole driver chip 1, thus affecting performance of a commonly used analog part of the second component area 200. At the same time, internal noise is also one of the reasons for device mismatch.

While, in the embodiment of the present application, the analog ground pad 210 of the second component area 200 is connected to the substrate 150 of each driving channel 300 through the metal wire 400, and the metal wire 400 directly applies a ground voltage potential to a contact part of the substrate 150 of the first component area 100, thus effectively reducing internal noise of the driver chip 1.

Optionally, a layout structure of the driver chip 1 may be applicable to a LED display driver product with common-anode structure, and may also be applicable to a LED display driver product with common-cathode structure.

Optionally, the common-source device module 310 includes a first field effect transistor 311, the common-gate device module 320 includes a second field effect transistor 321 and the operational amplifier module 340 includes an amplifier 341. The electrostatic protection module 330 includes an electro-static discharge (ESD) device.

Figure 3:
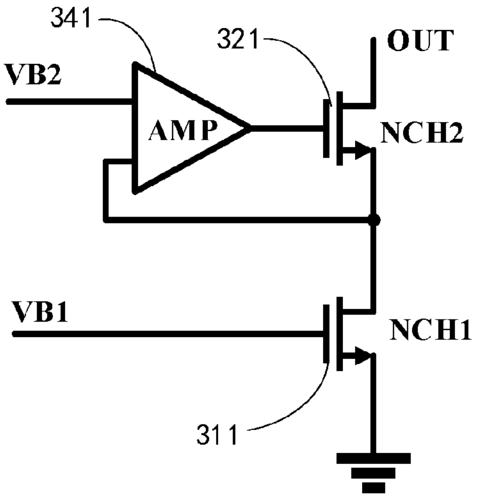
FIG. 3 shows a schematic diagram of a constant current source circuit in a driving channel according to an embodiment of the present application.

FIG. 3 shows a schematic diagram of a constant current source circuit in a driving channel 300 according to an embodiment of the present application. As shown in FIG. 3, the constant current source includes a first field effect transistor 311, a second field effect transistor 321 and an amplifier 341. Each of the first field effect transistor 311 and the second field effect transistor 321 is an NMOS (N-Metal-Oxide-Semiconductor) transistor.

A source of the first field effect transistor 311 is grounded, a gate of the first field effect transistor 311 is connected to a first voltage input terminal, a drain of the first field effect transistor 311 is connected to a source of the second field effect transistor 321, a drain of the second field effect transistor 321 is connected to a circuit output terminal, a gate of the second field effect transistor 321 is connected to an output terminal of the amplifier 341, a first input terminal of the amplifier 341 is connected to a second voltage input terminal, and a second input terminal of the amplifier 341 is connected to the source of the second field effect transistor 321.

In an LED display apparatus, such as a LED display screen, constant driving current may be provided by a constant current source driver chip based on a PWM (Pulse Width Modulation) signal, and display grayscale of the LED display apparatus may be equal to the number of grayscale clock GCLK included in the PWM signal, so accuracy of a driving current of each driving channel will affect final display effect. In the constant current source circuit described above, current accuracy mainly depends on an offset voltage of the first field effect transistor 311 and an offset voltage of the amplifier 341.

Based on the LED driver circuit described above, an embodiment of the present application also provides an LED display apparatus, which comprises the LED driver circuit according to embodiments of the present disclosure, and the LED display apparatus can be, for example, an LED display screen, and can also be applied to any electronic equipment required to equip with an LED display screen.

The above embodiments are merely examples to clearly illustrate technical solutions of the present disclosure and are not limitations on implementations. For those ordinary skills in the art, any other modification, equivalent replacement, improvement, and so on, made within the spirit and principles of this application remain within the protection scope of the present disclosure.

INDUSTRIAL PRACTICALITY

The technical proposal provided according to embodiments of the present disclosure can reduce internal noise of the chip, improve output current matching accuracy among the driving channels, thereby obtaining good current consistency and better ensuring the display effect of the LED display screen.

What is claimed is:

1. An LED driver circuit, comprising:

a first component area, comprising a first driving channel group and a second driving channel group, wherein the first driving channel group and the second driving channel group are symmetrically distributed, the first driving channel group and the second driving channel group respectively comprise a same number of driving channels;

a second component area, provided with an analog ground pad connected to a substrate of the driving channels through a metal wire, wherein each of the driving channels comprises a common-source device module, a common-gate device module and an electrostatic protection module; the common-source device module comprises a first field effect transistor and the common-gate device module comprises a second field effect transistor, a source of the first field effect transistor is grounded, a source of the second field effect transistor is directly connected to a drain of the first field effect transistor and a drain of the second field effect transistor is directly connected to a corresponding output terminal for providing output current, wherein in each of the driving channels, the first field effect transistor is disposed closer to a symmetry axis between the first driving channel group and the second driving channel group than the second field effect transistor, wherein in the first component area:

the metal wire comprises a first metal line, a second metal line, a third metal line and a fourth metal line that extend in a same direction separately in parallel, the LED driver circuit further comprises a plurality of output pads and a plurality of power ground pads;

the output pads corresponding to the first driving channel are located between the first metal line and the second metal line, the output pads corresponding to the second driving channel are located between the third metal line and the fourth metal line, and the plurality of power ground pads are located between the second metal line and the third metal line.

2. The LED driver circuit according to claim 1, wherein each of the driving channels further comprises:

an operational amplifier module, adjacent to the electrostatic protection module;

a blanking module, adjacent to the operational amplifier module and arranged at an edge of a driver chip comprising the LED driver circuit, wherein the common-source device module is disposed proximate to the symmetry axis between the first driving channel group and the second driving channel group; the common-gate device module is arranged adjacent to the common-source device module; the electrostatic protection module is arranged adjacent to the common-gate device module, thus compared with the first field effect transistor in the common-source module, the second field effect transistor in the common-gate module is positioned closer to the electrostatic protection module.

3. The LED driver circuit according to claim 2, wherein the common-source device modules in the driving channels of the first driving channel group are adjacent to the common-source device modules in the driving channels of the second driving channel group.

4. The LED driver circuit according to claim 2, wherein, in each one of the driving channels of the first driving channel group, the common-source device module, the common-gate device module, the electrostatic protection module, the operational amplifier module and the blanking module are sequentially arranged from right to left; and in each one of the driving channels of the second driving channel group, the common-source device module, the common-gate device module, the electrostatic protection module, the operational amplifier module and the blanking module are sequentially arranged from left to right.

5. The LED driver circuit according to claim 2, wherein each of the plurality of output pads, corresponds to a corresponding one of the driving channels, and is disposed at a position where the common-gate device module and the electrostatic protection module are adjacent to each other in that corresponding one of the driving channels.

6. The LED driver circuit according to claim 5, wherein a number of the plurality of output pads is 16.

7. The LED driver circuit according to claim 5, wherein each of the plurality of power ground pads, each of which corresponds to four corresponding ones of the driving channels and is disposed on the symmetry axis between the first driving channel group and the second driving channel group.

8. The LED driver circuit according to claim 7, wherein a number of the plurality of power ground pads is 4.

9. The LED driver circuit according to claim 1, wherein the metal wire has an even number of metal lines, which are symmetrically distributed.

10. The LED driver circuit according to claim 1, wherein the metal wire comprises:

the first metal line is arranged on a left side of the output pads of the first driving channel group and connected to a substrate of the first driving channel group;

the second metal line is arranged between the output pads of the first driving channel group and the plurality of power ground pads, and connected to the substrate of the first driving channel group;

the third metal wire is arranged between the output pads of the second driving channel group and the plurality of power ground pads, and connected to a substrate of the second driving channel group;

the fourth metal wire is arranged on a right side of the output pads of the second driving channel group and connected to the substrate of the second driving channel group.

11. The LED driver circuit according to claim 1, wherein the operational amplifier module comprises an amplifier, a gate of the first field effect transistor is connected to a first voltage input terminal, the drain of the first field effect transistor is connected to a source of the second field effect transistor, a drain of the second field effect transistor is connected to the corresponding output terminal, a gate of the second field effect transistor is connected to an output terminal of the amplifier, a first input terminal of the amplifier is connected to a second voltage input terminal, and a second input terminal of the amplifier is connected to the source of the second field effect transistor.

12. The LED driver circuit according to claim 1, wherein each of the first field effect transistor and the second field effect transistor is an NMOS transistor.

13. The LED driver circuit according to claim 1, wherein the number of the driving channels comprised by each of the first driving channel group and the second driving channel group is 8.

14. The LED driver circuit according to claim 1, wherein the second component area is further provided with an analog power supply pad.

15. An LED display apparatus, comprising the LED driver circuit according to claim 1.

16. The LED driver circuit according to claim 1, wherein the first component area is arranged in a lower region of a driver chip which comprises the LED driver circuit, the second component area is arranged in an upper region of the driver chip, and the analog ground pad is arranged at an upper edge of the driver chip.

17. The LED driver circuit according to claim 1, wherein in each of the driving channels, compared with the first field effect transistor in the common-source module, the second field effect module in the common-gate module and the electrostatic protection module are positioned closer to the corresponding output terminal for that driving channel.

18. The LED driver circuit according to claim 1, wherein a portion of the metal wire is located in the second component area and is implemented as a single metal line connected to the first metal line, the second metal line, the third metal line and the fourth metal line, the single metal line is wider than each of the first metal line, the second metal line, the third metal line and the fourth metal line.

* * * * *